(12) United States Patent
Dominissini et al.

(10) Patent No.: US 6,913,280 B2
(45) Date of Patent: Jul. 5, 2005

(54) OVERHEAD AIRBAG DEPLOYMENT APPARATUS AND METHOD

(75) Inventors: David L. Dominissini, Allen Park, MI (US); David W. Schneider, Waterford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 134 days.

(21) Appl. No.: 10/292,297

(22) Filed: Nov. 12, 2002

(65) Prior Publication Data

US 2004/0090050 A1 May 13, 2004

(51) Int. Cl.[7] .............................................. B60R 21/16
(52) U.S. Cl. .............................. 280/728.2; 280/730.1; 296/214
(58) Field of Search ................... 280/728.2, 730.1, 280/730.2; 296/214

(56) References Cited

U.S. PATENT DOCUMENTS

| | | | |
|---|---|---|---|
| 2,755,125 A | | 7/1956 | Hodges ........................ 296/84 |
| 2,834,606 A | | 5/1958 | Bertrand ...................... 280/150 |
| 5,265,903 A | | 11/1993 | Kuretake et al. ............ 280/730 |
| 5,280,991 A | * | 1/1994 | Weiland ....................... 296/214 |
| 5,470,103 A | | 11/1995 | Vaillancourt et al. ..... 280/730.1 |
| 5,484,186 A | * | 1/1996 | Van Order et al. ......... 296/97.5 |
| 5,602,734 A | | 2/1997 | Kithil |
| 5,613,701 A | * | 3/1997 | Bentley et al. .......... 280/728.3 |
| 5,775,726 A | | 7/1998 | Timothy et al. ......... 280/730.1 |
| 5,931,493 A | * | 8/1999 | Sutherland ............... 280/730.1 |
| 6,070,902 A | * | 6/2000 | Kowalski et al. ........ 280/730.2 |
| 6,231,072 B1 | | 5/2001 | Pywell et al. ............. 280/730.2 |
| 6,257,616 B1 | * | 7/2001 | Nowak et al. ........... 280/730.2 |
| 6,367,872 B1 | * | 4/2002 | Bohm et al. ............... 296/214 |
| 6,409,210 B1 | | 6/2002 | Emerling .................. 280/730.2 |
| 6,431,586 B1 | * | 8/2002 | Eyrainer et al. ......... 280/730.1 |
| 6,457,740 B1 | * | 10/2002 | Vaidyaraman et al. ... 280/730.2 |
| 6,464,255 B1 | * | 10/2002 | Preisler et al. .............. 280/752 |
| 6,508,486 B1 | * | 1/2003 | Welch et al. ............ 280/730.2 |
| 6,547,308 B2 | * | 4/2003 | Hamelink et al. ......... 286/97.9 |
| 6,817,627 B2 | * | 11/2004 | Galmiche et al. ........ 280/730.1 |
| 2002/0130494 A1 | * | 9/2002 | Blake et al. ............. 280/730.2 |
| 2002/0190506 A1 | * | 12/2002 | Tiesler .................... 280/730.1 |
| 2002/0190508 A1 | * | 12/2002 | Jost ......................... 280/730.2 |
| 2002/0195844 A1 | * | 12/2002 | Hipwell ...................... 296/214 |
| 2003/0205887 A1 | * | 11/2003 | Wallner et al. .......... 280/730.2 |

FOREIGN PATENT DOCUMENTS

| | | | |
|---|---|---|---|
| DE | 19860933 | 2/2002 | .......... B60R/21/22 |
| EP | 0904992 | 3/1999 | .......... B60R/21/16 |
| GB | 2345669 | 7/2000 | .......... B60R/21/20 |
| JP | 7117605 | 5/1995 | .......... B60R/21/16 |
| JP | 10264761 | 10/1998 | .......... B60R/21/22 |

* cited by examiner

*Primary Examiner*—Paul N. Dickson
*Assistant Examiner*—Laura B. Rosenberg
(74) *Attorney, Agent, or Firm*—Sally J. Brown (57) ABSTRACT

An enhanced overhead airbag assembly is provided. The overhead airbag assembly has an airbag module designed to be attached to the roof of a vehicle, rearward of the header. The airbag module is concealed from vehicle occupants via a headliner assembly that includes a headliner, header trim, central console, and sun visors. The header trim covers at least a portion of the header and overlaps the forward edge of the headliner on the passenger's side. The passenger's side headliner is shaped to form a deployment door to permit emergence of the inflating airbag cushion. The headliner is tethered to the roof via a frangible fastener so that the headliner does not interfere with inflation or strike the occupant.

37 Claims, 6 Drawing Sheets

OVERHEAD AIRBAG DEPLOYMENT APPARATUS AND METHOD

BACKGROUND OF THE INVENTION

1. Field of the Invention

The present invention relates to systems and methods for protecting vehicle occupants from injury. More specifically, the present invention relates to an apparatus and method for facilitating the deployment of an overhead airbag module.

2. Description of Related Art

Inflatable airbags are well accepted for use in motor vehicles and have been credited with preventing numerous deaths and injuries. Some statistics estimate that frontal airbags reduce the fatalities in head-on collisions by 25% among drivers using seat belts and by more than 30% among unbelted drivers. Statistics further suggest that with a combination of a seat belt and an airbag, serious chest injuries in frontal collisions can be reduced by 65% and serious head injuries by up to 75%. Airbag use presents clear benefits and vehicle owners are frequently willing to pay the added expense for airbags.

The inclusion of inflatable safety restraint devices, or airbags, is now a legal requirement for many new vehicles. Airbags are typically installed in the steering wheel and in the instrument panel on the passenger side of a car. In the event of an accident, an accelerometer within the vehicle measures the abnormal deceleration and triggers the ignition of an explosive charge. Expanding gases from the charge fill the airbags, which immediately inflate in front of the driver and passenger to protect them from impact against the windshield or instrument panel.

Airbag apparatuses have been primarily designed for deployment in front an occupant's torso, between the torso and the instrument panel. Conventional airbags, such as driver's side or passenger's side airbags protect the occupant's upper torso and head from colliding with a windshield or instrument panel. Such conventional airbag modules for frontal occupant protection deploy from the instrument panel or the steering wheel. This location has several disadvantages including poor protection for out-of-position (OOP) occupants and unaesthetic tear seams on the instrument panel or steering wheel.

Overhead airbags have been produced in an attempt to provide better protection for out-of-position vehicle occupants and avoid the necessity of installing airbags in the vehicle instrument panel. Unfortunately, known overhead airbags also have a number of disadvantages. Many are somewhat difficult to install because they require extensive modification of the vehicle roof. Some tend to deploy in such a manner that roof elements, such as the headliner or sun visor, are propelled toward the vehicle occupant or in a direction in which they can impede inflation of the airbag cushion.

Consequently, it would be an advancement in the art to provide an overhead airbag assembly that can be easily installed in a vehicle, with only limited modification of existing roof elements. Furthermore, it would be an advancement in the art to provide an overhead airbag assembly that permits rapid and unimpeded deployment of the airbag cushion without permitting roof elements to strike the vehicle occupant. Yet further, it would be an advancement in the art to provide an overhead airbag assembly that is inexpensive and readily adaptable to multiple vehicle and cushion types.

SUMMARY OF THE INVENTION

The apparatus and method of the present invention have been developed in response to the present state of the art, and in particular, in response to the problems and needs in the art that have not yet been fully solved by currently available airbag component attachment systems and methods. Thus, it is an overall purpose of the present invention to provide an overhead airbag deployment apparatus and method that provides for economy, simple installation of the airbag module, and reliable deployment without propelling roof elements in such a manner that they can injure a vehicle occupant.

To achieve the foregoing, and in accordance with the invention as embodied and broadly described herein in the preferred embodiment, an enhanced overhead airbag assembly is provided. The overhead airbag assembly is designed to protect an occupant of a front, passenger seat of a vehicle from frontal impact. The overhead airbag assembly includes an airbag module with a housing that contains a cushion and an inflator designed to expel inflation gas into the cushion to inflate the cushion in response to detection of a collision.

The airbag module is attached to a roof of the vehicle. The roof has a generally flat portion supported by one or more support ribs and a header, all of which extend in a generally lateral direction. The airbag module is mounted rearward of the header. A headliner assembly conceals the airbag module and the roof interior from the occupant. The headliner assembly includes a headliner designed to cover the main portion of the roof, headliner trim designed to cover the header, a central console, and sun visors for the driver's and passenger's sides. The central console is attached to a central, forward portion of the roof, and the sun visors are attached to the header through the header trim.

Upon detection of a collision, the inflator expels pressurized inflation gas into the cushion, and the cushion inflates to extend out of the housing. The cushion presses against and opens the headliner to extend forward of the occupant. The cushion has inflation tubes that inflate first to extend a main airbag body of the cushion forward of the occupant. The main airbag body then inflates to provide frontal impact protection.

The headliner is uniquely designed to open readily in response to pressure from the cushion. More precisely, the passenger's side of the headliner has a deployment door through which the cushion is able to extend. The headliner has a forward edge on the passenger's side, a lateral edge adjoining a central console cutout designed to receive the central console, and a groove designed to permit the headliner to pivot open. The forward edge, the lateral edge, and the groove cooperate to form the deployment door.

The header trim of the passenger's side is designed to overlap the forward edge of the headliner. Similarly, the central console is designed to overlap the lateral edge of the headliner. Thus, the forward and lateral edges are concealed from the occupant until the airbag module deploys. Upon deployment, the forward and lateral edges are pulled free to permit the deployment door to open. The sun visors are attached to the driver's and passenger's side header trim pieces in such a manner that the passenger's side sun visor does not interfere with emergence of the cushion through the deployment door. Rather, the passenger's side sun visor is simply rotated forward, toward the windshield, by the inflating cushion.

The headliner has, in general terms, a top cover, a substrate, and a bottom cover. The forward edge headliner may be gripped between the header trim and the header, and may additionally or alternatively be attached to the header via a frangible fastener. The frangible fastener has a roof portion attached to the header, a headliner portion attached to the headliner, and a frangible portion between the roof and headliner portions.

The roof portion may have a flexible tapered portion designed to be deformed upon insertion into a hole of the header. Once in place, the flexible tapered portion expands to prevent retraction of the flexible tapered portion through the hole. The headliner portion has a reinforcement plate disposed proximate the substrate, with a size sufficient to prevent the reinforcement plate from pulling through the top cover of the headliner. The frangible portion has a necked-down region with a small cross section designed to fracture in response to pressure of the inflating cushion against the headliner.

The overhead airbag assembly also has a tether with a first end attached to the roof portion and a second end attached to the headliner portion of the frangible fastener. When the frangible fastener breaks, the tether permits the roof and headliner portions to separate from each other until the tether tightens. Then, further motion of the headliner away from the header is arrested, thereby preventing the headliner from striking the occupant or interfering with inflation of the cushion.

According to one alternative embodiment, the frangible fastener has a headliner portion that is formed separately from the roof portion. The headliner portion is molded into the structure of the headliner substrate. The frangible portion then includes a receptacle integrally formed with the roof portion and a second flexible tapered portion integrally formed with the headliner portion. The second flexible tapered portion is inserted into the receptacle to attach the headliner and roof portions together. The second flexible tapered portion is able to pull free of the receptacle in response to the pressure exerted by the inflating cushion on the headliner.

Through the system and method of the present invention, an overhead airbag assembly may be provided in a manner that is cost effective and easy to install. The airbag module deploys in a reliable manner, without causing roof elements to extend so as to strike the vehicle occupant or impede deployment of the cushion. Hence, the vehicle occupant receives relatively safe and dependable frontal impact protection at a comparatively low cost.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 7, is not intended to limit the scope of the invention, as claimed, but is merely representative of presently preferred embodiments of the invention.

The present invention utilizes headliner edge management to provide a headliner structure that permits relatively easy egress of an airbag cushion in a visibly seamless fashion. Furthermore, the present invention utilizes tethering to limit the extension of roof elements toward the vehicle occupant to be protected. Yet further, the present invention utilizes frangible fastening to cover the airbag module in a manner that provides easy installation and stability during normal vehicle operation, while also providing a dependable deployment path for an inflating airbag cushion. The manner in which the above described principles are implemented by the present invention will be described in greater detail with reference to the Figures, as follows.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together. The terms "integrally formed" refer to a body that is manufactured unitarily, i.e., as a single piece, without requiring the assembly of multiple pieces. Multiple parts may be integrally formed with each other if they are formed from a single workpiece.

Figure 1:
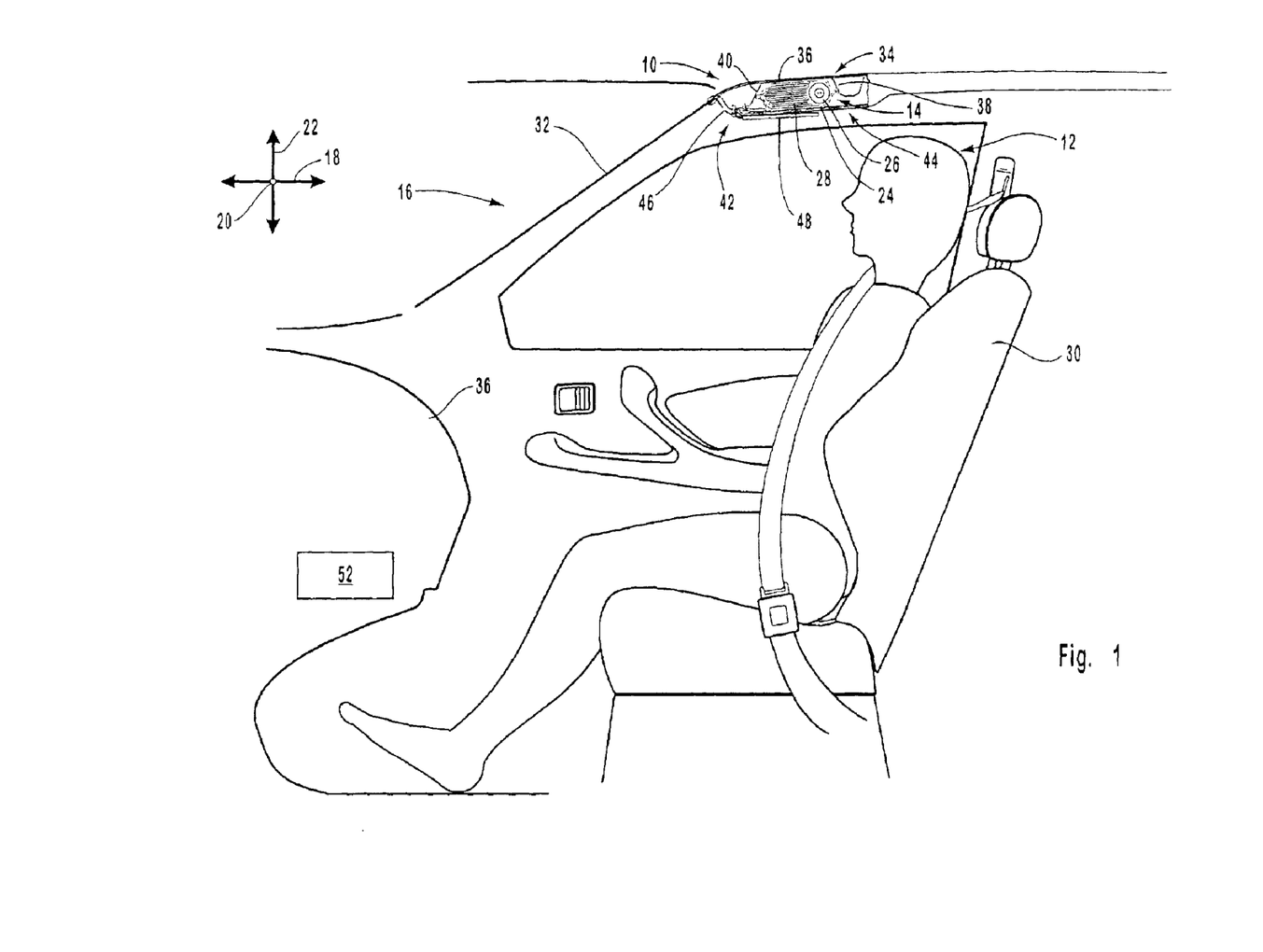
FIG. 1 is a side elevation, section view of a passenger's side of a vehicle incorporating an overhead airbag assembly according to one embodiment of the invention, with an airbag module in the stowed configuration.

Referring to FIG. 1, a side elevation, section view depicts one embodiment of an overhead airbag assembly 10 according to the present invention. The overhead airbag assembly 10 is used to cushion an occupant 12 against the force of frontal impact. The overhead airbag assembly 10 includes an overhead airbag module, or airbag module 14 installed in a vehicle 16. If desired, a corresponding airbag module (not shown) may be provided for the driver's side. The vehicle 16 has a longitudinal direction 18, a lateral direction 20, and a transverse direction 22.

In one configuration, the airbag module 14 includes a housing 24, an inflator 26, and an inflatable airbag cushion, or cushion 28. The housing may be flexible or rigid, and may thus be formed of a variety of materials including fabrics, plastics, metals, and the like. The inflator may be of any known type, including pyrotechnic, compressed gas, and hybrid inflators. The cushion 28 may be of a type that deploys in a manner that provides comprehensive frontal impact protection, with comparatively high effectiveness for out-of-position occupants. The airbag module 14 may be generally thin so that the thickness of the roof 34 need not be increased to accommodate the airbag module 14.

As shown, the inflator 26 is disposed within the housing 24, along with the cushion 28. However, in alternative embodiments, the inflator 26 may be separate from the housing 24, and may deliver inflation gas to the cushion 28 via a tube known as a gas guide. Thus, the inflator 26 may be positioned at any desirable location within the vehicle to avoid the space constraints of the roof 34.

The vehicle 16 includes, among other things, a seat 30, a windshield 32, a roof 34, and an instrument panel 36. The roof 34 includes a generally flat portion 36, support ribs 38, and a header 40. The header 40 supports and connects the windshield 32 to the roof 34. The airbag module 14 is affixed to one or more of the generally flat portion 36, the support ribs 38, and the header 40. As depicted, the airbag module 14 is disposed between the support rib 38 and the header 40. The support ribs 38 may be oriented along the lateral direction 20, as shown, or may be oriented along the longitudinal direction 18. The airbag module 14 may be configured to compactly fit in the overhead position without requiring any addition to the thickness of the roof 34.

In the embodiment of FIG. 1, the overhead airbag assembly 10 also includes a headliner assembly 42. The airbag module 14, the ribs 38, and the header 40 are concealed by the headliner assembly 42, which includes a headliner 44, one or more pieces of header trim 46, and a central console (not visible in FIG. 1). FIG. 1 depicts only the header trim 46 for the passenger's side. As shown, the header trim 46 is disposed underneath at least a portion of the header 40 to conceal the header 40 from the occupant 12. The headliner 44 extends rearward from the header trim 46 to conceal the airbag module 14 from the occupant 12. Hence, the unaesthetic tear seams required by traditional instrument panel installations can be avoided.

Optionally, the headliner assembly 42 also includes sun visors 48 for the driver's side and the passenger side. The sun visors 48 are configured to be oriented by vehicle occupants to block direct sunlight. Only the passenger's side sun visor 48 is depicted. The sun visor 48 may be attached to the header 40 through the header trim 46, as depicted. Alternatively, the sun visor 48 may be attached directly to the header trim 46. The sun visor 48 may be attached somewhat forward, for example, on the order of two inches, from the normal anchoring position of a sun visor within a vehicle.

In the embodiment of FIG. 1, the overhead airbag assembly 10 also has an electronic control unit (ECU) 52, which may be positioned anywhere within the vehicle 16. As shown, the ECU 52 is installed between the passenger and engine compartments. During normal operation of the vehicle 16, one or more airbag modules 14 may be connected to the ECU 52. The ECU 52 is connected to a sensor, which continuously monitors the acceleration and deceleration of the vehicle 16.

The acceleration and deceleration information is sent to a processor, which processes an algorithm to determine whether a collision has occurred. The ECU 52 may integrate occupant-related statistics into the algorithm to determine the response necessary during an accident situation. If an accident has occurred, the ECU 52 transmits an electrical current to an initiator (not shown) of the inflator 26 to initiate deployment of the airbag module 14.

Figure 2:
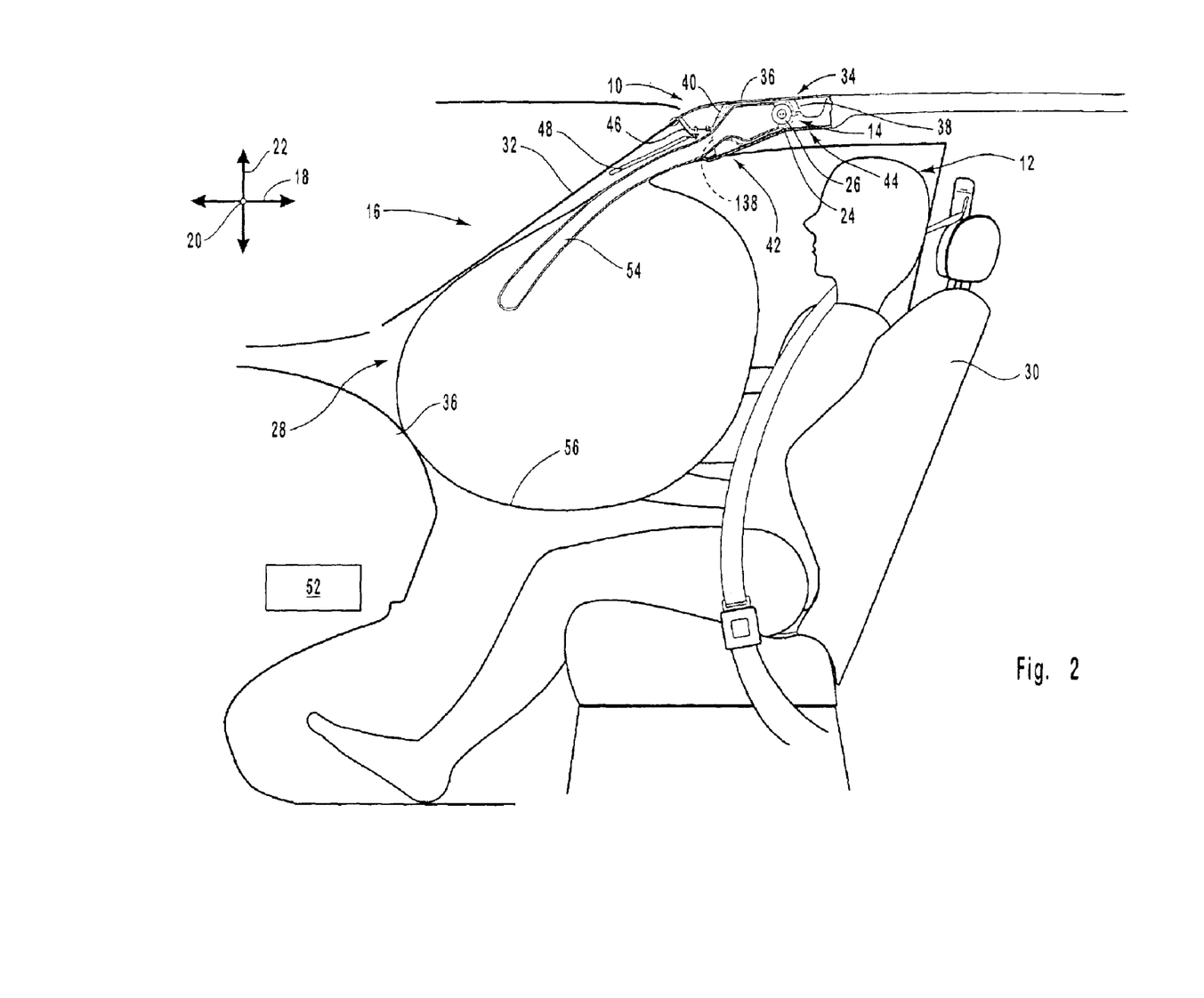
FIG. 2 is a side elevation, section view of the vehicle of FIG. 1, with the airbag module in the deployed configuration.

Referring to FIG. 2, a side elevation, section view illustrates the overhead airbag assembly 10 in the deployed configuration. Upon activation, the inflator 26 expels inflation gas into the cushion 28. The cushion 28 initially inflates in a direction generally parallel to the windshield 32. More precisely, the cushion 28 has a pair of inflation tubes 54, into which the inflation gas first flows from the inflator 26. The inflation tubes 54 are generally aligned with each other as viewed along the lateral direction 20. The section view of FIG. 2 is taken through the left inflation tube 54, looking at the vehicle 16 from the rear. Thus, the only inflation tube 54 visible in FIG. 2 is the inflation tube 54 through which the section view is taken.

The inflation tubes 54 inflate to convey a main airbag body 56 out of the housing 24 and along the windshield 24. Inflation gas is conveyed further, from the inflation tubes 54 to the main airbag body 56, and the main airbag body 56 expands to provide forward impact protection. This inflation process may provide better protection to the occupant 12 from impact with the windshield 32 or from projectiles moving from the vicinity of the windshield 32. Furthermore, such an inflation scheme may also help keep the occupant 12 inside the vehicle 16 during a frontal collision or rollover. In any case, the inflated main airbag body 56 assumes a position suitable for protecting the occupant 12 from frontal impact. In this application, "impact protection" refers to cushioning the occupant 12 from impact against a comparatively hard surface.

Figure 3:
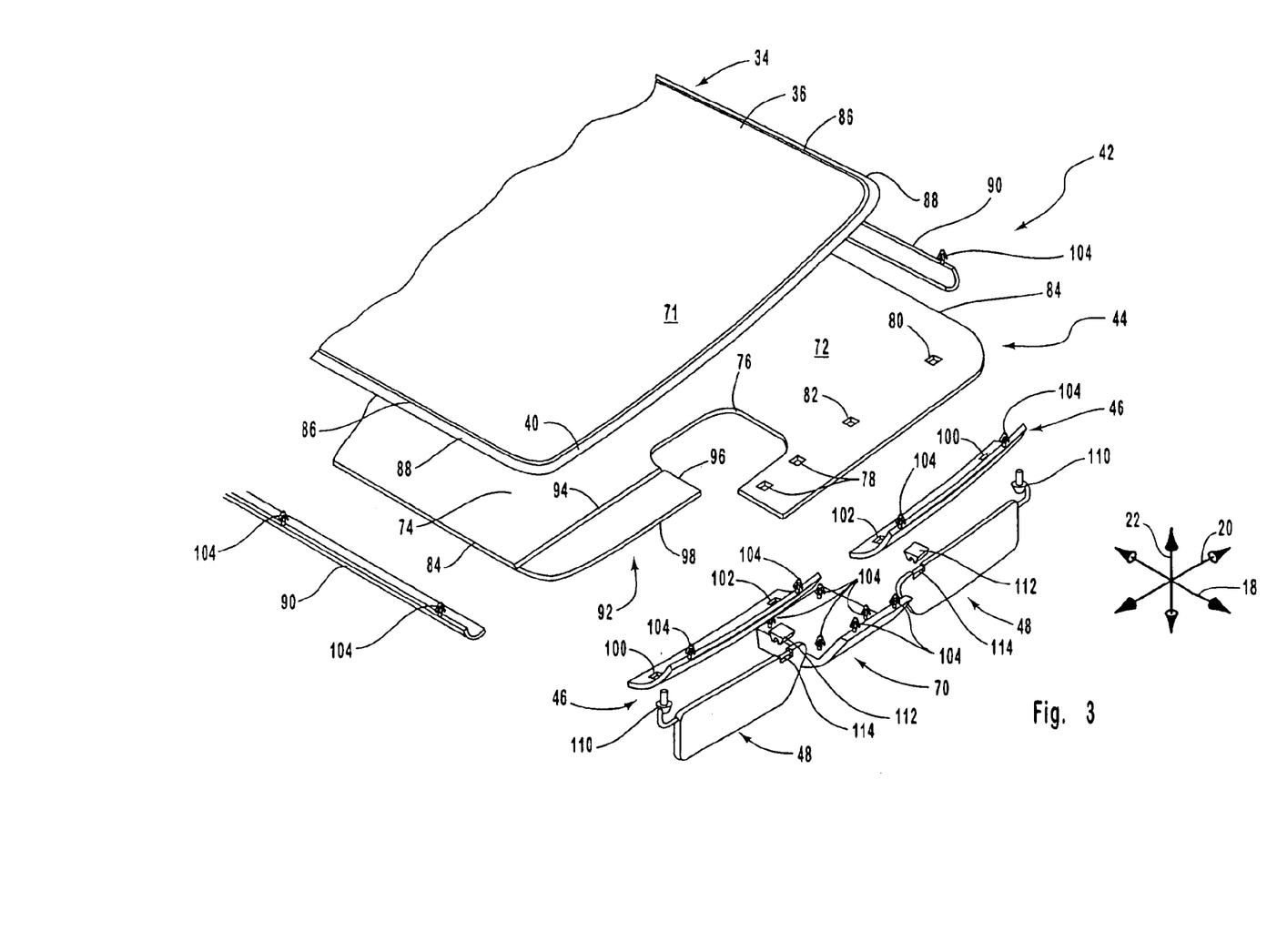
FIG. 3 is an exploded, perspective view of the headliner assembly of the overhead airbag assembly of FIG. 1.

Referring to FIG. 3, an exploded, perspective view depicts a portion of the headliner assembly 42 of the overhead airbag assembly 10 along with a corresponding portion of the roof 34. As described previously, the headliner assembly 42 includes the headline 44, headliner trim 46, sun visors 48, and a central console 70. In the embodiment of FIG. 3, two separate pieces of headliner trim 46 are provided for the passenger's and driver's sides. The central console 70 overlaps both pieces of headliner trim 46.

The central console 70 is designed to be positioned proximate a central, forward portion 71 of the roof 34. As shown in FIG. 3, the central, forward portion 71 is the portion of the roof 34 that is centrally positioned with respect to the lateral direction 20, and disposed at the header 40 and between the header 40 and the forward-most support rib 38 in the longitudinal direction 18. The central console 70 may have a display used to display information pertinent to the vehicle 16, the weather, or navigation. The central console 70 may additionally or alternatively be used to retain various objects such as sunglasses and a remote control for a garage door opener.

The headliner 44 has a driver's side 72 and a passenger's side 74. A central console cutout 76 straddles the driver's side 72 and the passenger's side 74 to align with the central, forward portion of the roof 34. The central console cutout 76 is slightly smaller than the profile of the central console 70, looking along the transverse direction 22. Thus, the central console 70 does not fit within the central console cutout 76, but rather is attached to the roof 34 through the central console cutout 76 and overlaps the edges of the headliner 44 along the central console cutout 76. Additionally, the central console 70 extends forward of the central console cutout 76, and is attached to the header 40 through a pair of central console attachment holes 78.

The driver's side 72 of the headliner 44 extends forward far enough to generally overlap the header 40. Since the sun visors 48 are to be attached to the header 40, the headliner 44 includes a visor pivot hole 80 and a visor retention hole 82, which are used to permit pivotal anchoring and selective retention, respectively, of the sun visor 48 of the driver's side 72. The passenger's side 74 of the headliner 44 does not extend forward as far as the driver's side 72, for reasons that will be described below.

The headliner 44 has peripheral edges 84 at the extents of the headliner 44 in the lateral direction 20. The peripheral edges 84 are to be attached to corresponding peripheral edges 86 of the roof 34. According to one example, the roof 34 also has a pair of roof rails 88 positioned at the peripheral edges 86 of the roof 34. The roof rails 88 extend generally along the longitudinal direction 18, and may be connected to the header 40 so that the roof rails 88 and the header 40 form one continuous structure. The peripheral edges 84 of the headliner 44 may be clamped against the roof rails 88 by pieces of roof rail trim 90, which extend beneath the roof rails 88. The pieces of roof rail trim 90 may optionally be part of the headliner assembly 42.

The headliner 44 has a deployment door 92 that permits the cushion 28 to emerge from the compartment formed by the roof 34 and the headliner 44. More precisely, the headliner 44 has a groove 94 that extends from the central console cutout 76 to the peripheral edge 84 of the passenger's side. The groove 94 is formed in the upper portion of the headliner 44 so as not to be visible to the occupant 12.

The headliner 44 also has a lateral edge 96, defined as that portion of the passenger's side of the central console cutout 76 that is oriented generally along the longitudinal direction 18 and extends forward of the groove 94. Furthermore, the headliner 44 has a forward edge 98 on the passenger's side 74. The forward edge 98 extends from the lateral edge 96 to the peripheral edge 84 of the passenger's side 74.

The groove 94, the lateral edge 96, and the forward edge 98 (and the portion of the peripheral edge 84 of the passenger's side that lies forward of the groove 94) cooperate to form the deployment door 92. The lateral edge 96 and the forward edge 98 are releasably attached to the roof 34 by the central console 70 and the header trim 46 of the passenger's side 74, respectively. The aforementioned portion of the peripheral edge 84 of the passenger's side 74 may also be releasably retained against the roof 74 by the roof rail trim 90 of the passenger's side 74. Thus, the edges of the deployment door 92 are not visible during normal vehicle operation because they are covered by the central console 70, the passenger's side header trim 46, and/or the passenger's side roof rail 90.

As the cushion 28 begins to inflate, it presses against the deployment door 92. This induces the release of the lateral edge 96, the forward edge 98, and possibly the aforementioned portion of the peripheral edge 84 of the passenger's side 74, from the roof 34. The deployment door 92 is then able to pivot downward along the groove 94 to provide space for emergence of the cushion 28 between the passenger's side 74 of the headliner 44 and the header 40.

The sun visors 48 may be attached to the header 40 through the pieces of header trim 46. Hence, each of the pieces of header trim 46 may have a visor pivot hole 100 and a visor retention hole 102. On the driver's side 72, the visor pivot hole 100 and the visor retention hole 102 of the header trim 46 are positioned to align with the visor pivot hole 80 and the visor retention hole 82 of the headliner 44.

However, the headliner 44 has no such holes on the passenger's side 74 because the forward edge 98 does not extend far enough to overlap the visor pivot hole 100 and the visor retention hole 102 of the header trim 46 of the passenger's side 74. Thus, mounting the sun visor 48 on the passenger's side 74 does not impede detachment of the forward edge 98 from the roof 34 during deployment of the airbag module 14.

The central console 70, the pieces of header trim 46, and the pieces of roof rail trim 90 may all be attached to the roof 34 via fasteners 104, which may be Christmas tree-type fasteners, as depicted. A Christmas tree-type fastener has a flexible tapered portion designed to contract to fit into a hole and assume its original shape once it has been inserted through the hole to prevent retraction. Other fastener types, such as nuts and bolts, may be used in addition or in the alternative to the fasteners 104 shown in FIG. 3. Adhesives, welding, and other attachment techniques may also be used.

If desired, the headliner assembly 42 may be assembled prior to attachment of the central console 70, header trim 46, or roof rail trim 90 to the roof 34. For example, the headliner 44 may be attached to the central console 70, header trim 46, and roof rail trim 90 via an adhesive. The portions of the headliner 44 that are designed to be removable from the roof 34 may be either weakly attached or devoid of any attachment to the central console 70, header trim 46, and/or roof rail trim 90. Once assembled, the headliner assembly 42 may be installed in the vehicle 16 by attaching the fasteners 104 to the roof 34.

The sun visors 48 may each have a pivotal attachment 110, such as a pivoting bolt or the like, and a retainer 112. Each retainer 112 retains a retention feature 114 of a sun visor 48 such that the occupant 12 (or the driver) can pull the sun visor 48 free of the retainer 112 to move the sun visor 48, for example, to cover part of a side window. The pivotal attachments 110 and the retainers 112 may each be attached to the header 40 through the visor pivot hole 100 and visor retention hole 102, respectively, of their associated piece of header trim 46.

According to one alternative embodiment, the sun visors 48 may be attached to the pieces of header trim 46 prior to installation of the headliner assembly 42 in the vehicle 16. Thus, the sun visors 48 may be part of the headliner assembly 42. Upon attachment of the headliner assembly 42 to the roof 34, the sun visors 48 may then be attached to the header 40 as well as the pieces of header trim 46, or they may simply remain attached to the pieces of header trim 46.

Figure 4:
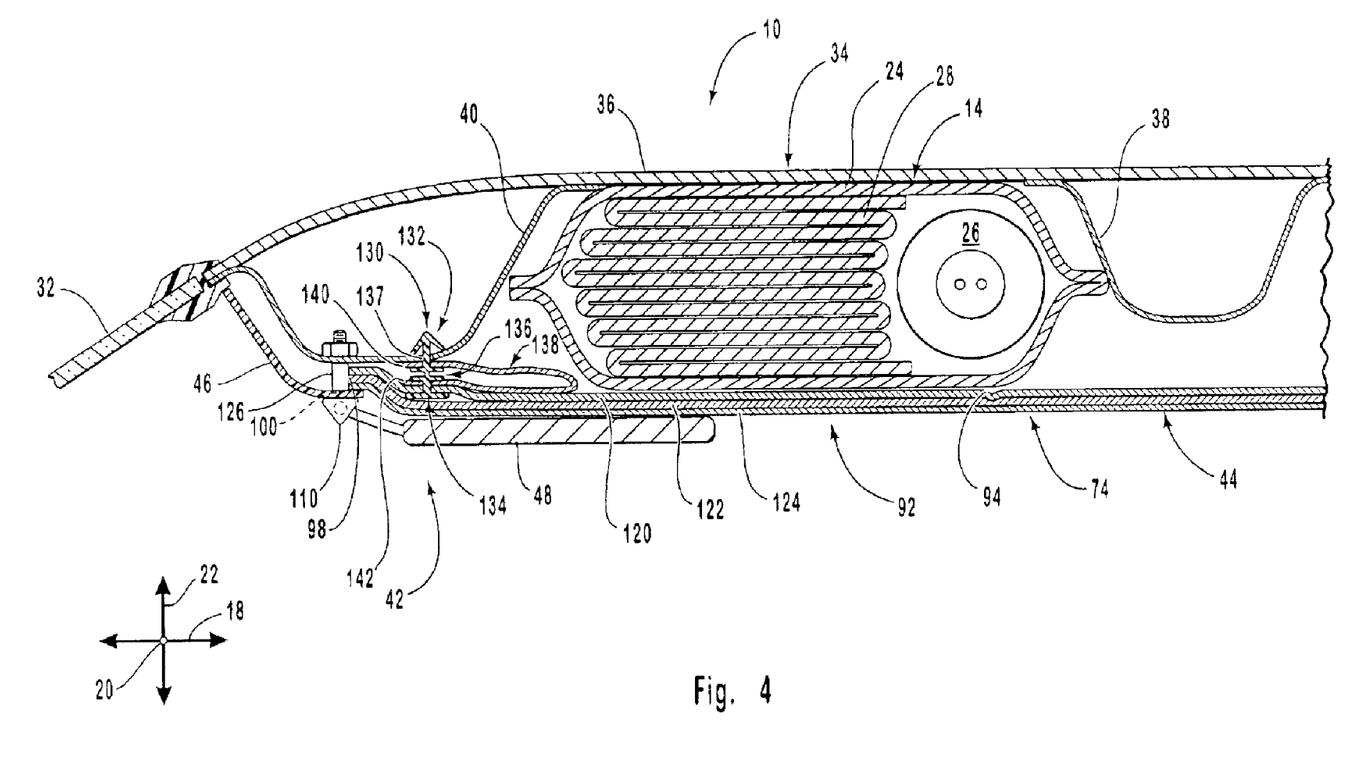
FIG. 4 is an enlarged side elevation, section view of the overhead airbag assembly of FIG. 1, with the airbag module in the stowed configuration

Referring to FIG. 4, a side elevation, section view depicts an enlarged view of the overhead airbag assembly 10 and the front portion of the roof 34 of the vehicle 16. The section view is taken through the same plane as that of FIGS. 1 and 2. As shown, the headliner 44 has three layers: a top cover 120, a substrate 122, and a bottom cover 124. According to one embodiment, the top cover 120 is a fiberglass layer, the substrate 122 comprises an insulative foam material, and the bottom cover 124 is constructed of a nylon-based fabric designed to match the other interior surfaces of the vehicle 16, such as the header trim 46 and the roof rail trim 90. According to alternative embodiments, the headliner 44 may be structured and layered in a wide variety of ways. The layers of the headliner 44 may be molded together, or may be formed separately and attached together.

The pivotal attachment 110 of the passenger's side sun visor 48 may be attached to the header 40 via a fastener 126, as depicted. The fastener 126 may take the form of a bolt/nut combination, a rivet, a screw, a Christmas tree-type fastener, or any of a variety of other fastener types. As mentioned previously, the pivotal attachment 110 may alternatively be attached only to the header trim 46.

As described previously, the forward edge 98 of the headliner 44 is sandwiched between the header 40 and the header trim 46. Thus, the forward edge 98 is attached to the header 40. The header trim 46 may optionally exert force against the forward edge 98 to grip the forward edge 98 against the header 40. Furthermore, the forward edge 98 may be attached to the header 40 via a frangible fastener 130.

As shown, the frangible fastener 130 has a roof portion 132 attached to the header 40, a headliner portion 134 attached to the forward edge 98, and a frangible portion 136 between the roof portion 132 and the headliner portion 134. In this application, attachment to an edge, such as attachment of the headliner portion 134 to the forward edge 98, is not necessarily attachment to the very terminal end. Rather, as depicted in FIG. 4, attachment to an edge refers to attachment to the span of material adjoining the edge.

The roof portion 132 is attached to the header 40 via a hole 137 formed in the header 40. The overhead airbag assembly 10 also includes a tether 138 with a first end 140 attached to the roof portion 132 and a second end 142 attached to the headliner portion 134. The tether 138 may be formed of a fabric such as a seat belt webbing material, a wire, or some other somewhat flexible material.

The frangible portion 136 is designed to permit the headliner portion 134 to separate from the roof portion 132 when a threshold level of tension is reached in the frangible portion 136. When the cushion 28 begins to inflate, the cushion 28 exerts pressure on the housing 24 of the airbag module 14. The housing 24, in turn, presses downward against the deployment door 92, thereby transmitting tensile force to the frangible portion 136. The frangible portion 136 then breaks to permit the deployment door 92 to open to release the cushion 28 into the passenger compartment of the vehicle 16. The cushion 28 continues to inflate to obtain the configuration depicted in FIG. 5.

Figure 5:
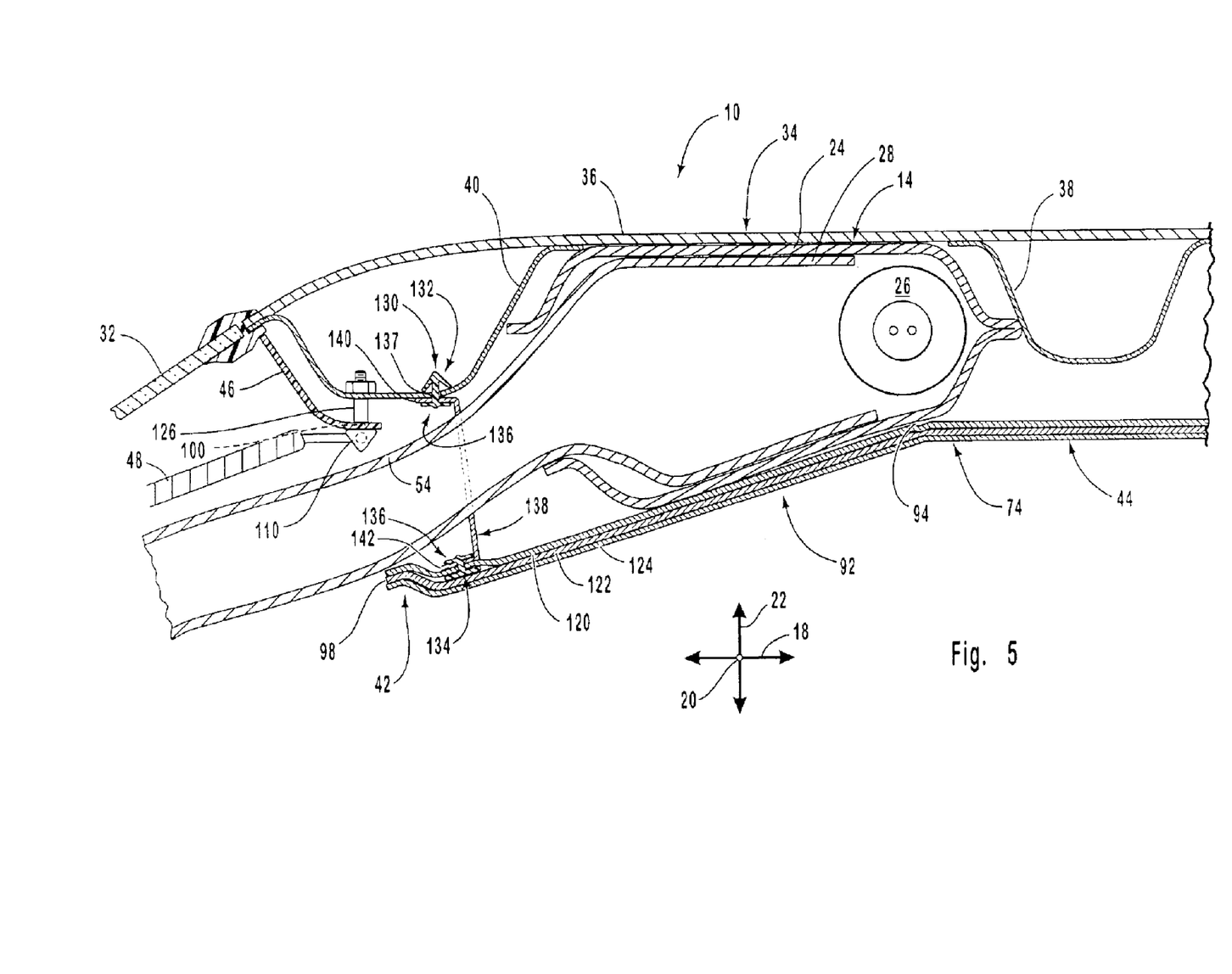
FIG. 5 is an enlarged side elevation, section view of the overhead airbag assembly of FIG. 1, with the airbag module in the deployed configuration

Referring to FIG. 5, a side elevation, section view depicts an enlarged view of the overhead airbag assembly 10 and the front portion of the roof 34 of the vehicle 16. The section view is taken through the same plane as FIGS. 1, 2, and 4. The airbag module 14 is deployed to provide frontal impact protection for the occupant 12.

The frangible portion 136 has broken to permit separation of the headliner portion 134 from the roof portion 132. The forward edge 98 of the headliner 44 has pulled free of the header trim 46, and the lateral edge 96 (not visible in FIG. 5) has pulled free of the central console 70 (not visible). The portion of the peripheral edge 84 (not visible) on the deployment door 92 has also pulled free of the roof rail trim 90 (not visible) if it was retained by the roof rail trim 90.

The deployment door has opened by pivoting about the groove 94 to provide an opening through which the cushion 18 can move. The housing 24 has also opened. The cushion 18 has emerged through the housing 24 and the deployment door 92 and inflated to obtain the configuration depicted in FIG. 2. The sun visor 48 has been pivoted forward by the cushion 28, thereby removing the sun visor 48 from the deployment path of the cushion 28. Forward attachment of the sun visor 48 helps the sun visor 48 to pivot in the manner shown, regardless of whether the sun visor is seated against the headliner 44 at the time of deployment. The inflation tubes 54 extend through the deployment door 92, as depicted.

The tether 138 has been drawn taught by motion of the forward edge 98 away from the header 40. The range of pivotal motion of the deployment door 92 is limited by the length of the tether 138 so that the deployment door 92 is unable to open far enough to impede inflation of the cushion 28 or strike the occupant 12. The tether 138 may have a length ranging from about three inches to about twelve inches. Furthermore, the tether 138 may have a length ranging from about five to about ten inches. Yet further, the tether may have a length of about eight inches.

The frangible fastener 130 may be configured in a wide variety of ways. The frangible fastener 130 will be shown and described in greater detail in connection with FIG. 6. An alternative embodiment of a frangible fastener will be shown and described in connection with FIG. 7. For this application, "frangible" means separable into multiple parts. Use of the term "frangible" does not require breakage of a part of the frangible fastener to permit opening.

Figure 6:
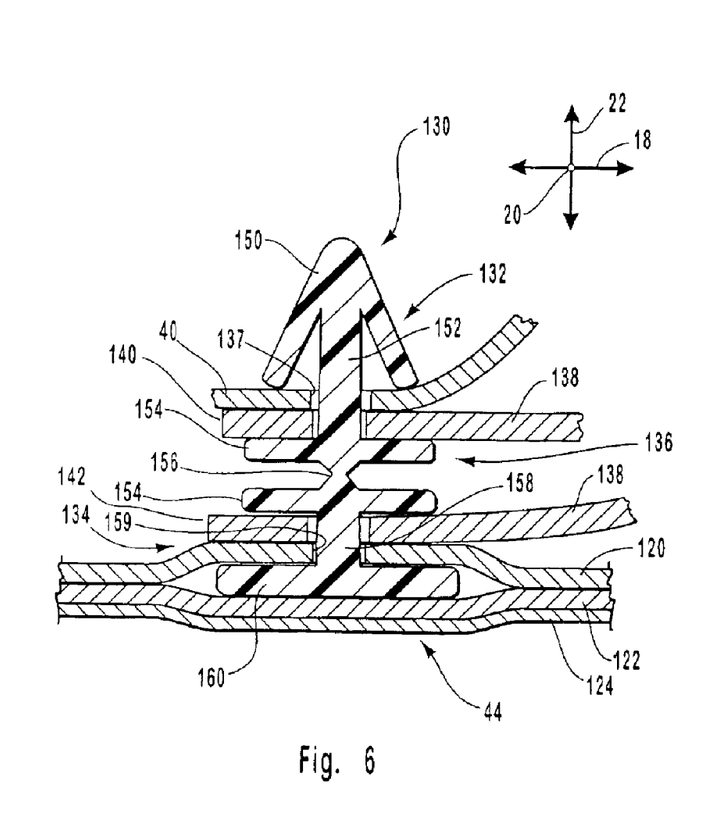
FIG. 6 is an enlarged side elevation, section view of the frangible fastener of the overhead airbag assembly of FIG. 1.

Referring to FIG. 6, a side elevation, section view depicts the frangible fastener 130 along with a portion of the header 40 and a portion of the headliner 44. FIG. 6 more clearly depicts the roof portion 132, the headliner portion 134, and the frangible portion 136. As shown, the roof portion 132 includes a Christmas tree-type fastener, which has a flexible tapered portion 150 designed to contract in response to insertion into the hole 137 of the header 40. Once the flexible tapered portion 150 has passed through the hole 137, the flexible tapered portion 150 is able to expand again to prevent retraction of the flexible tapered portion 150 back through the hole 137.

The roof portion 132 also has a shank 152 that connects the flexible tapered portion 150 to the remainder of the frangible fastener 130. Each of the roof and headliner portions 132, 134 has a tether retention disc 154; the tether retention discs 154 are designed to retain the first and second ends 140, 142 of the tether 138. The frangible portion 136 has a necked-down region 156 with a cross section selected to permit the frangible portion 136 to break in response to the tensile stress produced by deployment of the airbag module 14.

The headliner portion 134 also has a shank 158. In the embodiment of FIG. 6, the shank 158 passes through a hole 159 of the top cover 120 to reach a reinforcement plate 160. As shown, the reinforcement plate 160 is sandwiched between the top cover 120 and the substrate 122. The reinforcement plate 160 has a comparatively large size designed to prevent the reinforcement plate 160 from pulling through the top cover 120 when the airbag module 14 deploys, for example, by tearing out from the hole 159.

The first end 140 of the tether 138 is retained by the shank 152 of the roof portion 132. Similarly, the second end 142 is retained by the shank 158 of the headliner portion 134. If the tether 138 is composed of a fabric, the first and second ends 140, 142 may each have a hole. The shanks 152, 158 then pass through the holes of the first and second ends 140, 142. Alternatively, for example, if the tether 138 is composed of a wire, the first and second ends 140, 142 may be wrapped around the shanks 152, 158, respectively.

As another alternative, the tether 138 may be formed integrally with the frangible fastener 130. For example, the frangible fastener 130 may be molded from plastic, and the tether 138 may be a length of plastic molded simultaneously and unitarily with the frangible fastener 130. As yet another alternative, the first and second ends 140, 142 may be attached to the shanks 152, 158 by some other method after formation of the frangible fastener 130.

If desired, the headliner portion 134 may first be attached to the forward edge 98 of the headliner 44, so that the frangible fastener 130 and the tether 138 are part of the headliner assembly 42. Then, the frangible fastener 130 may be installed in the header 40 at the time the remaining fasteners 104 of the headliner assembly 42 are attached to the roof 34.

The frangible fastener 130 may operate in conjunction with a second frangible fastener (not shown) that similarly attaches the forward edge 98 to the header 40. The second frangible fastener has a tether similar to the tether 138. The frangible fastener 130 and the second frangible fastener may be positioned outside the inflation tubes 54 in the lateral direction 20. The second frangible fastener is therefore not visible in FIGS. 4 and 5 because it is positioned behind the plane through which the cross section is taken. As a result of the positioning of the frangible fasteners, the inflation tubes 54 deploy between the frangible fasteners so that motion of the inflation tubes is not impeded by the frangible fasteners or by the tethers attached to the frangible fasteners.

The frangible fastener 130 of FIGS. 4–6 is formed unitarily and configured to fracture in response to tensile stress. However, a frangible fastener may also incorporate multiple pieces that detach from each other in response to the stress. Such a configuration will be shown and described in connection with FIG. 7.

Figure 7:
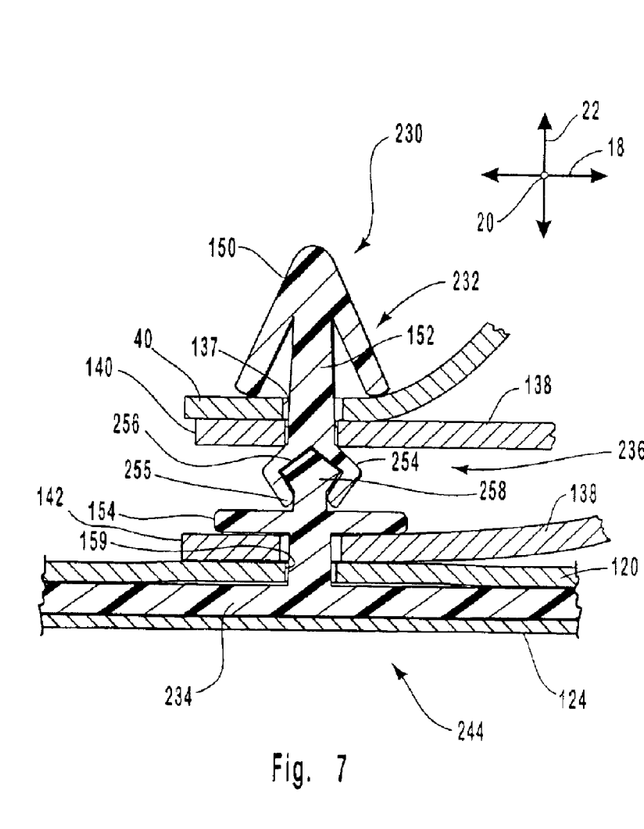
FIG. 7 is an enlarged side elevation, section view of a frangible fastener according to one alternative embodiment of the invention.

Referring to FIG. 7, a side elevation, section view depicts a frangible fastener 230 according to one alternative embodiment of the invention. Like the frangible fastener 130 of FIGS. 4–6, the frangible fastener 230 has a roof portion 232. However, the frangible fastener 230 also has a headliner portion/substrate 234, because the headliner portion and headliner substrate are integrally formed. The roof portion 232 and the headliner portion/substrate 234 are not integrally formed, but are attached to each other at a frangible portion 236 of the frangible fastener 230. According to one example, the headliner portion/substrate 234 may be molded into the shape depicted in the course of the molding operation used to form the headliner 244.

The roof portion 232 has a Christmas tree-type fastener, in the form of a flexible tapered portion 150 designed to contract to be inserted into the hole 137 of the header 40. The roof portion 232 also has a shank 152 that extends from the flexible tapered portion 150 to a receptacle 254 of the frangible portion 236. The receptacle 254 has a hole 255. The receptacle 254 is shaped to receive a second flexible tapered portion 256 of the frangible portion 236, which is inserted into the hole 255 in a manner similar to that of the flexible tapered portion 150. The second flexible tapered portion 256 is integrally formed with the headliner portion/substrate 234, which includes a tether retention disc 154 and a shank 158 that extends through a hole 159 of the top cover 120.

The frangible portion 236 also has a tapered backing 258 that connects with the second flexible tapered portion 256. The tapered backing 258 is also compressible, and is shaped to contract in response to withdrawal through the hole 255. Compression of the tapered backing 258 also causes compression of the second flexible tapered portion 256. Thus, the second flexible tapered portion 256 and the tapered backing 258 can both be withdrawn from the receptacle 254 in response to the exertion of a threshold tensile force on the frangible portion 236. Consequently, the frangible portion 236 permits separation of the headliner portion/substrate 234 from the roof portion 232 in response to deployment of the airbag module 14, thereby permitting a deployment door of the headliner 244 to open.

The methods and apparatus of the present invention provide an overhead airbag assembly that is cost effective and easy to install. An overhead airbag module may be installed in a vehicle with comparatively little modification to the headliner assembly. The unique headliner and frangible fastener designs allow the airbag module to deploy with relative ease and rapidity, with a low incidence of deployment hang-ups. Furthermore, the probability of occupant injury due to motion of roof elements during deployment is minimized by the use of a tether coupling the headliner to the roof.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A headliner assembly operable with an airbag module attached to a roof of a vehicle, wherein the airbag module comprises a cushion configured to inflate to protect an occupant of the vehicle from impact, the headliner assembly comprising:
  a central console configured to be installed proximate a central, forward portion of the roof; and
  a headliner configured to extend underneath the airbag module to conceal the airbag module from the occupant, the headliner having a lateral edge coupled to the central console;
  wherein at least a portion of the lateral edge is removable from the central console to permit the headliner to open toward the vehicle occupant along the lateral edge to permit emergence of the cushion forward of the headliner.

2. The headliner assembly of claim 1, wherein the roof comprises a header having a generally lateral orientation, the headliner assembly further comprising a header trim configured to conceal the header from the occupant.

3. The headliner assembly of claim 2, further comprising a visor attached to the header trim such that, upon inflation, the cushion urges the visor forward, out of a deployment path of the cushion.

4. The headliner assembly of claim 2, wherein the headliner comprises a forward edge configured to be disposed between the header and the header trim, wherein the headliner is configured to at least partially detach from the header to permit inflation of the cushion between the forward edge and the header.

5. The headliner assembly of claim 4, further comprising a frangible fastener configured to attach the forward edge to the header such that the forward edge is able to detach from the header in response to deployment of the airbag module.

6. The headliner assembly of claim 4, wherein the headliner comprises a groove having a generally lateral orientation, wherein the groove cooperates with the lateral edge and the forward edge to form a deployment door configured to pivot open at the groove to facilitate emergence of the cushion.

7. The headliner assembly of claim 1, further comprising a tether having a first end configured to be attached to the roof and a second end attached to the headliner, wherein the tether has a length selected to permit emergence of the cushion between the headliner and the header and to restrict motion of the headliner toward the occupant.

8. An overhead airbag assembly configured to be installed proximate a roof of a vehicle, the roof having a header having a generally lateral orientation, the overhead airbag assembly comprising:
   an airbag module attachable to the roof, rearward of the header, the airbag module having a cushion configured to inflate to protect an occupant of the vehicle from impact; and
   a headliner having a forward edge configured to be coupled to the header such that the headliner extends underneath the airbag module to conceal the airbag module from the occupant, wherein the headliner comprises a groove having a generally lateral orientation, wherein the groove cooperates with the lateral edge and the forward edge to form a deployment door configured to pivot open at the groove to facilitate emergence of the cushion.
   wherein the headliner is configured to at least partially detach from the header to permit inflation of the cushion between the headliner and the header.

9. The overhead airbag assembly of claim 8, further comprising a header trim attached to the header to conceal the header from the occupant.

10. The overhead airbag assembly of claim 9, wherein the header trim is configured to grip the forward edge against the header.

11. The overhead airbag assembly of claim 10, further comprising a visor attached to the header trim such that, upon inflation, the cushion urges the visor forward, out of a deployment path of the cushion.

12. The overhead airbag assembly of claim 8, further comprising a frangible fastener configured to attach the forward edge to the header, wherein the frangible fastener is able to separate to permit detachment of the forward edge from the header in response to deployment of the airbag module.

13. The overhead airbag assembly of claim 8, further comprising a tether having a first end configured to be attached to the roof and a second end attached to the headliner, wherein the tether has a length selected to permit emergence of the cushion between the headliner and the header and to restrict motion of the headliner toward the occupant.

14. The overhead airbag assembly of claim 8, wherein the airbag module is positioned to deploy to protect the occupant when the occupant is positioned in a front, passenger seat of the vehicle.

15. The overhead airbag assembly of claim 8, wherein the headliner has a lateral edge configured to be positioned proximate a central, forward portion of the roof.

16. The overhead airbag assembly of claim 15, further comprising a central console configured to grip the lateral edge against the roof and to conceal the lateral edge from the occupant.

17. A headliner assembly operable with an airbag module attached to a roof of a vehicle, wherein the airbag module comprises a cushion configured to inflate to protect an occupant of the vehicle from impact, the headliner assembly comprising:
   a headliner configured to extend underneath the airbag module to conceal the airbag module from the occupant, the headliner further comprising a lateral edge configured to be positioned proximate a central, forward portion of the roof and a groove having a generally lateral orientation, wherein the groove cooperates with the lateral edge and the forward edge to form a deployment door configured to pivot open at the groove to facilitate emergence of the cushion; and
   a tether attached to the headliner and configured to be attached to the roof;
   wherein the tether has a length selected to permit sufficient motion of the headliner away from the roof to permit emergence of the cushion forward of the headliner and to limit motion of the headliner toward the occupant.

18. The headliner assembly of claim 17, wherein the roof comprises a header having a generally lateral orientation, the headliner having a forward edge configured to be coupled to the header, wherein the tether is attached to the forward edge and configured to be attached to the header.

19. The headliner assembly of claim 18, further comprising a frangible fastener configured to attach the forward edge to the header, wherein the frangible fastener is able to separate to permit detachment of the forward edge from the header in response to deployment of the airbag module.

20. The headliner assembly of claim 19, wherein the frangible fastener comprises a roof portion and a headliner portion, the tether comprising a first end attached to the roof portion and a second end attached to the headliner.

21. The headliner assembly of claim 17, wherein the length ranges from about three inches to about twelve inches.

22. A frangible fastener configured to releasably attach a headliner to a roof of a vehicle such that the headliner is able to open to permit deployment of an airbag module, the airbag module comprising a cushion configured to inflate to protect an occupant of the vehicle from impact, wherein the headliner comprises a lateral edge configured to be positioned proximate a central, forward portion of the roof and a groove having a generally lateral orientation, wherein the groove cooperates with the lateral edge and the forward edge to form a deployment door configured to pivot open at the groove to facilitate emergence of the cushion, the frangible fastener comprising:
   a roof portion configured to engage the roof;
   a headliner portion configured to engage the headliner; and
   frangible portion between the roof portion and the headliner portion, wherein the frangible portion is configured to permit separation of the roof portion from the headliner portion in response to deployment of the airbag module.

23. The frangible fastener of claim 22, wherein the roof portion comprises a flexible tapered portion configured to contract in response to insertion into a hole of the header and to expand in response to completion of passage through the hole such that the flexible tapered portion is retained within the hole.

24. The frangible fastener of claim 22, wherein the headliner portion is molded into a substrate of the headliner.

25. The frangible fastener of claim 22, wherein the headliner portion comprises:
  a shank extending through a hole of a top cover of the headliner; and
  a reinforcement plate disposed underneath the top cover to prevent removal of the shank from the hole during deployment of the airbag module.

26. The frangible fastener of claim 22, wherein the roof portion and the headliner portion are integrally formed, and wherein the frangible portion comprises a necked-down region configured to fracture in response to tensile force induced by deployment of the airbag module.

27. The frangible fastener of claim 22, wherein the roof portion and the headliner portion are separately formed, and wherein the frangible portion comprises a fastening feature configured to removably attach the roof portion to the headliner portion such that the fastening feature unfastens in response to tensile force induced by deployment of the airbag module.

28. The frangible fastener of claim 27, wherein the fastening feature comprises a second flexible tapered portion of one of the roof portion and the headliner configured to contract in response to insertion into a hole of the other of the roof portion and the headliner portion and to expand in response to completion of passage through the hole such that the second flexible tapered portion is retained within the hole.

29. The frangible fastener of claim 22, wherein the roof portion is attached to a first end of a tether and the headliner portion is attached to a second end of the tether, the tether having a length selected to permit sufficient motion of the headliner away from the roof to permit emergence of the cushion forward of the headliner and to limit motion of the headliner toward the occupant.

30. A method for installing a headliner assembly in a vehicle, the headliner assembly comprising a central console and a headliner, the vehicle comprising a roof having a header having a generally lateral orientation, the vehicle having an airbag module attached to the roof rearward of the header, the airbag module having a cushion configured to inflate to protect an occupant of the vehicle from impact, the method comprising:
  disposing a lateral edge of the headliner proximate a central console;
  attaching peripheral edges of the headliner to peripheral edges of the roof such that the headliner extends underneath the airbag module to conceal the airbag module from the occupant; and
  attaching the central console to a central, forward portion of the roof;
  wherein, upon attachment of the central console to the central, forward portion, the lateral edge is attached to the central console such that at least a portion of the lateral edge is removable from the central console to permit the headliner to open toward the vehicle occupant along the lateral edge to permit emergence of the cushion forward of the headliner.

31. The method of claim 30, further comprising attaching a forward edge of the headliner to the header such that at least a portion of the forward edge is removable from the header to permit emergence of the cushion forward of the headliner.

32. The method of claim 31, wherein attaching the forward edge to the header comprises:
  attaching a header trim to the forward edge; and
  attaching the header trim to the header such that the forward edge is sandwiched between the header trim and the header.

33. The method of claim 31, wherein attaching the forward edge to the header comprises:
  engaging the forward edge with a headliner portion of a frangible fastener; and
  engaging the header with a roof portion of the frangible fastener;
  wherein the frangible fastener is configured to permit separation of the headliner portion from the roof portion in response to deployment of the airbag module to release the forward edge from header.

34. A method for deploying an overhead airbag in a vehicle comprising a roof having a header having a generally lateral orientation, an airbag module attached to the roof rearward of the header, and a headliner having a forward edge attached to the header such that the headliner extends underneath the airbag module to conceal the airbag module from an occupant of the vehicle, and wherein the headliner further comprises a lateral edge configured to be positioned proximate a central, forward portion of the roof and a groove having a generally lateral orientation, wherein the groove cooperates with the lateral edge and the forward edge to form a deployment door configured to pivot open at the groove to facilitate emergence of the cushion, the method comprising:
  commencing inflation of the cushion to exert pressure on the headliner;
  detaching the forward edge from the header in response to the pressure; and
  continuing inflation of the cushion to induce the cushion to extend between the headliner and the header to obtain a position forward of the occupant to protect the occupant from impact.

35. The method of claim 34, wherein the forward edge is gripped between the header and a header trim that conceals the header from the occupant, wherein detaching the forward edge from the header comprises removing the forward edge from between the header and the headliner.

36. The method of claim 34, wherein the forward edge is attached to the header via a frangible fastener having a roof portion that engages the header and a headliner portion that engages the forward edge, wherein detaching the forward edge from the header comprises separating the headliner portion from the roof portion.

37. The method of claim 34, wherein the headliner is further attached to the roof by a tether, the method further comprising restraining motion of headliner toward occupant via the tether.

* * * * *